Jan. 2, 1968     G. O. TURNBULL     3,361,136

TRASH REMOVAL ROLLS

Filed April 14, 1965

Inventor
Glen O. Turnbull

Attorney

United States Patent Office 3,361,136
Patented Jan. 2, 1968

3,361,136
TRASH REMOVAL ROLLS
Glen O. Turnbull, Rock Island, Ill., assignor to International Harvester Company, Chicago, Ill., a corporation of Delaware
Filed Apr. 14, 1965, Ser. No. 448,123
3 Claims. (Cl. 130—30)

ABSTRACT OF THE DISCLOSURE

A trash removal apparatus for mounting on the upper end of a harvester elevator having multiple pairs of trash removal rolls located with respect to the harvester elevator such that the trash depending upon its condition will be directed to a particular pair of rolls. This device divides the trash and provides a set of rolls for each portion to thus avoid the situation where one set of rolls is over-supplied and the other set under-supplied.

---

The instant invention relates to corn harvesting apparatus and the like. More particularly the instant invention relates to trash removal means for corn harvesters.

A conventional corn harvester comprises a driven frame provided with means at the front or forward end thereof adapted to aggressively gather and detach ears of corn from standing stalks. Detached ears are normally fed rearwardly of the harvester frame to a husking mechanism in which husks are adapted to be stripped.

In customary harvesting operation, matter, such as corn stalks and other debris, is included in and fed inwardly and rearwardly of a harvester frame together with harvested ears of corn. The salks and other debris which are referred to as trash are undesirable, and, to minimize their inclusion with harvested corn crop which is to be delivered to a husking mechanism, trash removal means are conventionally provided.

Conventionally, trash removal means comprise a pair of oppositely rotating rollers which are ordinarily called trash rolls and which are spaced from the delivery end of a crop conveyor known as a first elevator. Such trash rolls are adapted to grip stalks and other trash which bridge the gap between a first elevator and such trash rolls and to direct the trash away from an orifice into which harvested ears of corn will fall or are to be delivered for husking.

Trash rolls generally are disposed transversely of the general path of movement of an associated first elevator in a manner calculated to catch all trash which is at least as long as the gap between such trash rolls and the delivery end of such first elevator. However, shorter stalks which are not of sufficient length to extend to the trash rolls and therefore cannot be gripptd and removed thereby will not be separated from harvested corn but will be delivered therewith to a husking mechanism.

It might be assumed that by reducing the gap between a first elevator and trash rolls associated therewith to less than that normally prevailing, more trash could be removed. While a wider range of sizes could be removed with such change, the overall consequence when following such practice is for less efficiency resulting from choking of trash rolls and the path to their associated husking mechanism. That effect occurs because the quantity of the stalks and other debris which the trash rolls would then be in a position to remove is too great for the trash rolls to handle within the size limitation of harvester equipment. Accordingly, malfunction would result and the purpose of such respacing would be defeated.

What conventionally prevails is disposition of a single pair of trash rolls in a compromise position which is adapted to allow some trash to be delivered with harvested corn crop into a husking mechanism while ejecting other portions of trash. Even employing such compromise or conventional positioning of trash rolls, choking thereof and clogging of a delivery throat occur under ordinary field conditions characterized by relatively large amounts of broken stalks, with resultant consequences well known in the art.

It is a primary object of the instant invention to provide an improved corn harvesting device.

It is another object of the instant invention to provide in a corn harvesting device an improved trash removal mechanism.

It is a further object of the instant invention to provide, in the trash removal mechanism one means adapted to remove long stalks and separate means adapted to remove short stalks from harvested corn crop prior to delivery thereof to a husking mechanism.

A still further object of the instant invention is the provision in a corn harvesting device of a plurality of pairs of trash rolls, each adapted for the elimination of trash, such as broken stalks, from harvested corn, with a view to improving cleanliness over that available by employing conventional devices.

Yet another object of the instant invention is the provision of cooperating pairs of trash removal rolls in a corn harvesting device spaced from the end of a corn harvesting first elevator with which such trash rolls are associated, and with the axes of each adjacent pair of trash rolls disposed in non-vertical alignment to engage and remove stalks and other trash of varying lengths from a corn crop.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figure 1:
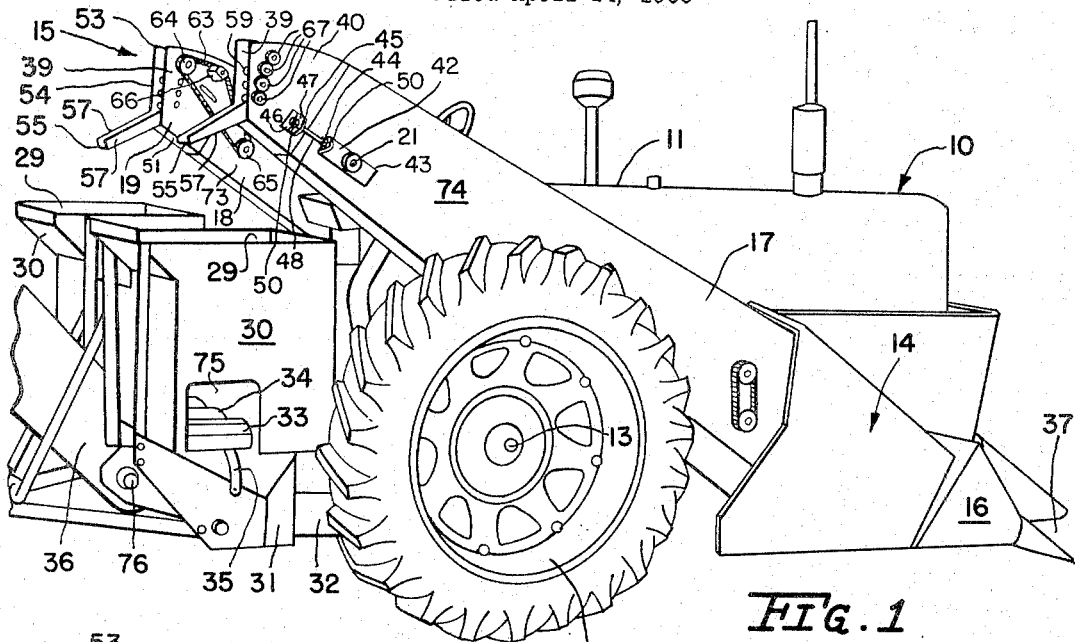
FIG. 1 illustrates one embodiment of the instant invention in perspective mounted on a corn harvester.

Referring now more particularly to the drawings, there is shown in FIG. 1 a corn harvester machine which includes a tractor generally designated by the numeral 10. The tractor has an elongated body 11 which is carried on a pair of large rear traction wheels 12, only one of which is shown in the drawings. A pair of front supporting wheels (not shown) supports the front end portion of the tractor in a conventional manner. The traction wheels 12 are mounted in a conventional fashion on opposite end portions of an axle 13 which is operably supported in the frame of the tractor 10 and connected in any conventional manner to the drive transmission mechanism (not shown) of the tractor 10.

The harvester comprises a pair of downwardly and forwardly extending row units 14 and 15 which are disposed on opposite sides of the tractor body 11 between the respective right and left traction wheels 12 and said body. Each of the row units 14 and 15 includes at its lower front end portion a casing or shield 16 for a gathering and snapping or severing mechanism which is adapted aggressively to gather and detach ears of corn from rows of stalks upon which said ears of corn grow. Only one of said casings or shields 16 is seen in the drawings.

The row units 14 and 15 also include a pair of "first" elevators 19 which are disposed within respective elevator housings 17 and 18 and extend rearwardly and upwardly. Elevator housings 17 and 18 may be rectangular in cross section in accordance with conventional design. Inasmuch as each elevator 19 is substantially the same as the other, only one thereof is shown in the drawings, being the rear end portion illustrated in FIG. 2.

Figure 2:
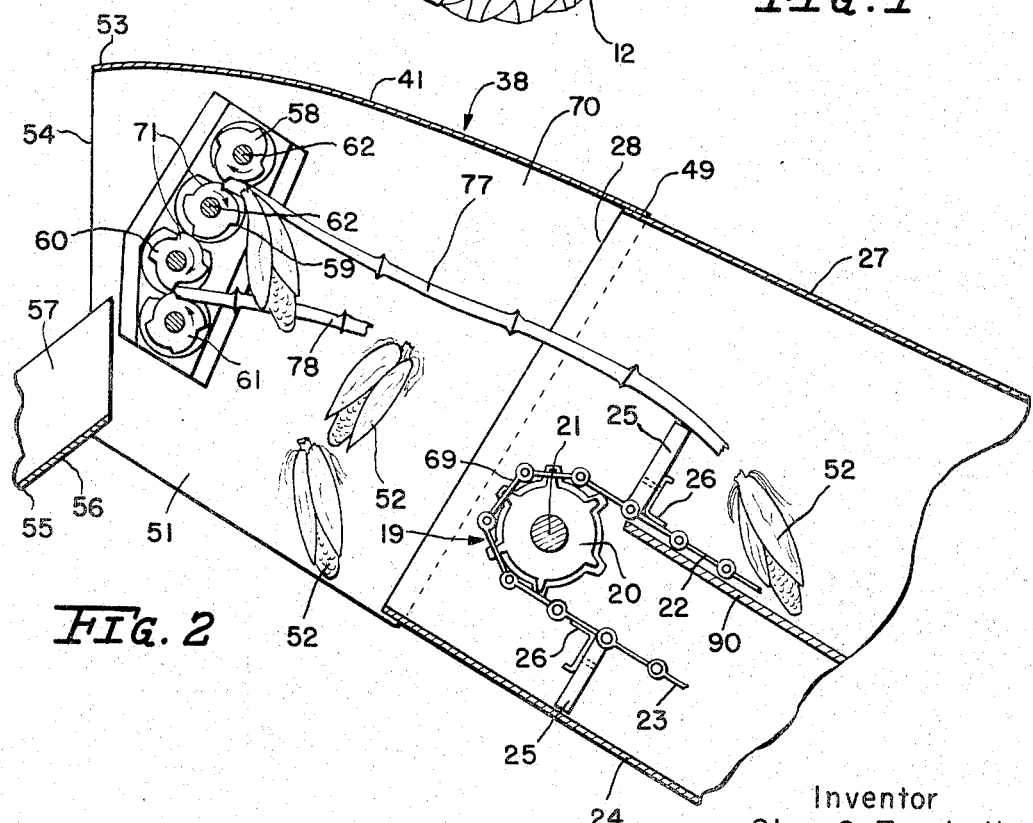
FIG. 2 is a longitudinal sectional view of a portion of the first elevator housing and being transverse to the longitudinal axes of the trash rolls embodying said invention.

Each elevator 19 is of the overshot type and comprises an endless power driven sprocket chain which is operably mounted on a sprocket wheel 20 in operative engagement therewith. Each sprocket wheel 20 is secured to an upper driven shaft 21 which is journalled transversely of its associated elevator housing and defines the path of its conveyor. The disposition of each elevator 19 is such that its upper conveying course 22 is substantially parallel to the longitudinal axis of the associated elevator housing, and accordingly is disposed at an incline sloping upwardly as it extends to the rear. The lower idle course 23 of each conveyor or elevator 19 is substantially parallel to its upper course 22 and to the lower wall 24 of its respective elevator housing from which said lower course is spaced a distance sufficient to accommodate outwardly extending elevator flights 25, as illustrated in FIG. 2.

The flights 25 are slats which are secured by angular bracket 26 to the sprocket claim. The upper course 22 of the elevator 19 is supported by a bottom sheet 90 which functions as the material supporting surface for the picked ear corn and accompanying trash. Brackets 26 are right angular and are rigidly secured to associated flights 25 and their conveyors, in any conventional or suitable manner known in the art. While the spacing of the lower course 23 of each conveyor 19 may be only wide or high enough to accommodate its moving flights 25, the spacing of the upper wall 27 of each elevator housing from the upper course 22 is substantially greater than the lineal dimension by which its flights 25 extend away from such upper course 22 to provide adequate space to pass along such upper course all material normally expected to be harvested.

Each conveyor sprocket shaft 21 is mounted adjacent and slightly inwardly or downstream of a normal crop delivery opening 28 which is defined by the upper end portion 49 of each housing 17 and 18. Each opening 28 is disposed above and in vertical or delivery alignment with an upper end or receiving opening 29 of a respective husking mechanism casing 30. Each of the casings 30 is rigidly held on the tractor framework extension 31 below its respective crop delivery opening 28 by support means such as braces or posts 32, or the like, as illustrated in FIG. 1.

Each of the housings 30 contains a husking bed 33, only one of which is seen in the drawings. Each husking bed comprises a plurality of journalled husk stripping rollers 34 which are suitably supported within their respective casings 30 by means which may include standards or legs 35, in the manner illustrated in FIG. 1. Adjacent the lateral ends of the husking beds 33, the casing is apertured, slotted or otherwise opened to provide a husk ejection port 75 through which husks removed by rollers 34 are passed or spilled from the harvester 10.

The bed 33 is adapted to deliver husked ears of corn medially of the casings 30, and drop them into the lower end portion of a wagon elevator casing or housing 36. Husked ears thereafter are removed from the tractor 10 by a wagon elevator mechanism driven by a shaft 76 which is journalled in the lower end portion of said housing 36.

The aforedescribed components are essentiially conventional and have not been defined with great particularity, as the structure and manner of function are well known in the art. However, the instant invention is characterized by structural components and arrangement of parts which are to become hereafter apparent and which relate to what is conventionally referred to in the art as trash rolls. Trash rolls are for use in eliminating trash such as broken stalks which especially conventionally create harvesting problems in dry conditions of harvesting because they are broken easily by gathering chains and snapping rolls as they pass into the throat 37. Thereafter, such trash is carried together with corn up elevator 19.

To the end that the trash rolls can be removably mounted on each row unit 14 and 15 and employed only when desired, there is provided a housing extension, trash roller hanger or hood 38 which is telescopically mounted on the outer, upper or upstream end portion 49 of each of the elevator housings 17 and 18 about a respective end opening 28. Each housing extension 38 comprises an inner side plate 39, a parallel outer side plate 40 and a top slightly bowed, arcuate or curved connecting plate 41 which is integral with, or, at its opposite side portions, connected to side plates 39 and 40.

The housing extensions or hangers 38 are adjustably and removably secured on their respective housing end portions 49 by means of a right angular bracket 42, one leg 43 of which is rigidly secured along its length to the exposed surface of outer wall 74 of its respective elevator housing. The other leg 44 of each bracket 42 extends outwardly from and normal or perpendicular to the plate 40 of its respective housing extension. A right angular bracket 45, having one leg 46 along its length secured to each plate 40, has an outwardly extending leg 47 which extends parallel to the leg 44 and normal to its plate 40. A pin 48 the opposite ends of which are threaded extends through aligned apertures in the pair of legs 44 and 47 associated with each of the row units 14 and 15. A pair of opposed lock nuts 50 is mounted on each threaded end portion of each pin 48, with each pair of said lock nuts 50 disposed on an opposite side of each of the bracket legs 44 and 47 to adjustably fasten the housing extension or hanger 38 to its respective elevator housing.

A lower opening or downwardly directed port 51 is defined in each housing extension or trash roll hanger 38 by the lower end of its extension side plates 39 and 40. The opening or ear delivery port 51 of each row unit 14 and 15 is vertically aligned with an associated receiving opening 29 of each husking mechanism housing 30, as illustrated in the drawings. Thereby, ears of corn 52 which have fallen from the end of an elevator or conveyor 19 and clear throat 70 at the end thereof will drop through opening or delivery port 51 into an associated husking mechanism housing 30.

The outer end portions 53 of the extensions 38 may terminate above the receiving openings 29. However, trash which is ejected from the harvester 10 by trash rolls to the hereinafter described will be deflected from each housing 30 by reason of an ejection opening 54 which is defined in each outer end portion 53 by respective side plates 39 and 40 and top plate 41 and in the lower end portions of which openings 54 trash deflectors 55 are supported to direct trash beyond the openings 29 in a manner illustrated in FIG. 1. As illustrated in the drawings, the deflectors 55 may be trough-like, each having a base 56 which is disposed between a pair of side flanges 57 which may be secured by any suitable means to respective side walls or plates 39 and 40 to incline deflectors 55 downwardly and outwardly at an angle which will not intersect associated openings 29.

A plurality of trash rolls 58, 59, 60 and 61 are arranged in cooperating pairs. In the embodiment illustrated, the rolls 58 and 59 comprise one pair, and the rolls 60 and 61 comprise a second pair therof. The trash rolls 58, 59, 60 and 61 are operably mounted on shafts 62 which provide the axes of rotation for their respective rolls. The shafts 62 of each row unit 14 and 15 have their opposite end portions journalled, in any suitable manner, in associated side plates 39 and 40 between which said shaft 62 together with their respective rolls 58, 59, 60 and 61 extend transversely, as illustrated in the drawings.

To the end that trash will be ejected through the openings 54, each roller 58 is mounted to rotate clockwise while its associated or cooperating roller 59 is mounted to rotate counterclockwise. Similarly, each roller 60 is mounted to rotate clockwise while its cooperating or associated roller 61 is mounted to rotate counterclockwise. For rotating the trash rolls, suitable power driven means may be connected to a tractor power source in a conventional fashion well known to those skilled in the art, and may include in the power train a sprocket chain 63 which is disposed adacent each inner extension plate 39 in operative engagement with a sprocket wheel 64 which is carried on an inner end portion of the shaft 62 of an associated roller 58, as illustrated to the left of FIG. 1. Each chain 63 is driven by reason of operable connection on a sprocket wheel 65 which is mounted on an inner end extension of its shaft 21, which is journalled in the inner and outer side walls 73 and 74 of its respective elevator housing 17 or 18.

Because of the removable construction of the hood or housing extension 38, means must be provided to suitably tension the sprocket chain 63. To that end, any conventional sprocket tensioning mechanism, such as that illustrated at 66 to the left in FIG. 1 and adjustably disposed adjacent the exposed surface of inner elevator housing wall 73 may be employed.

The means for transmitting the torque imparted to each sprocket wheel 64 by its chain 63 to another trash roll 60 in its row unit may include a series of engaging gears designated 67 mounted on the outside or opposite end portion of the shafts 62 of each roll 58. Thereby the rollers of each set 58 and 59 and 60 and 61 are driven in opposite directions and each set operates to feed material rearwardly.

As well illustrated in FIG. 2, the pairs of rollers 58 and 59 and 60 and 61 are disposed in spaced relationship from the forward or upstream end 69 of the conveyor 19 and toward the outer end portion 53 of the housing extension or trash roll hanger 38 and above the base 56 of the deflector 55. The pair of rollers 58 and 59 are located with respect to the elevator 19 such that any long stalks, such as the stalk designated 77, that are supported on the upper edges of adacent flights 25 will be ejected through rollers 58 and 59. It should be noted that because of the direction of travel of rollers 58 and 59 (designated by arrows in FIGURE 2) any material contacting these rollers will be directed between the rollers. It should also be noted that some small trash lying between flights 25 will be grasped by rollers 58 and 59 due to the flipping action of flights 25 as they reach the end of elevator 19. However, most small trash such as short stalks 78 lying between flights 25 are grasped by the lower set of rollers 60 and 61. Most smaller trash is grasped by the lower set of rollers 60 and 61 not only because of their lower location but also because they are located closer to the free end of conveyor 19 and thus are positioned to encounter the trash that is unable to bridge the gap to the upper set of rollers.

It is appreciated that there is sufficient spacing of all of the trash rolls from the end 69 of the conveyor to permit ears 52 to fall freely through the opening 51. Furthermore, attention is invited to the fact that the trash rolls will also act as snapping rolls in the sense that ears which have not been severed from the trash stalks 77 and 78 will be snapped from the stalks in the manner illustrated to the upper left of FIG. 2.

In accordance with the foregoing construction, trash of varying lengths can be efficiently and effectively removed from harvested corn by reason of plural effects which include disposition of trash rolls to deal with trash of varying lengths and also the distribution of trash load over a plurality of sets of trash rolls to minimize mechanism clogging or choking effects.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. For use with a corn harvester having a housing defining a delivery opening, an elongated conveyor disposed longitudinally within said housing for carrying harvested corn through said housing and terminating in a delivery end, said conveyor being of the overshot type comprising a continuous chain having cross flights connected thereto, a casing having a receiving opening disposed in receiving alignment with said delivery opening, a trash roll mechanism carried by said housing comprising a plurality of pairs of trash rolls, the rolls of each pair being mounted to rotate in opposite directions and disposed in spaced relationship from the delivery end of said conveyor with the pairs of rollers adapted to deflect trash of varying lengths away from said delivery and receiving openings, one pair of trash rolls being substantially aligned with the top edges of said cross flights such that the material supported on said flights will be aimed toward said one pair of trash rolls, and wherein another pair of trash rolls is positioned substantially below the top edges of said cross flights such that material carried between adjacent cross flights will be aimed toward said another pair of trash rolls.

2. For use with a corn harvester having an inclined housing, said housing having an upper delivery opening, a first elevator angularly disposed within said housing for carrying harvested corn upwardly in said housing, said first elevator being of the overshot type comprising a continuous chain having connecting cross flights, and a casing having a receiving opening disposed below and in receiving alignment with said delivery opening, a trash roll mechanism comprising a housing extension mounted on the upper end of said inclined housing and extending rearwardly therefrom, said housing extension having a clean corn opening aligned with said receiving opening and a trash ejection opening disaligned with said receiving opening; a plurality of pairs of trash rolls rotatably mounted in said housing extension and disposed transversely of the longitudinal axis of said first elevator and adapted to eject debris through said trash ejection openings, one pair of trash rolls being substantially aligned with the top edges of said cross flights such that the material supported on said flights will be aimed toward said one pair of trash rolls, and wherein another pair of trash rolls is positioned substantially below the top edges of said cross flights such that material carried between adjacent cross flights will be aimed toward said another pair of trash rolls.

3. The invention as set forth in claim 2 wherein a deflector is mounted on said trash roll housing and positioned such that trash deflected by said rolls is directed away from said casing and said trash roll housing.

References Cited

UNITED STATES PATENTS 2,370,560   2/1945   Maus _____ 130—33
2,894,364   7/1959   Ehler _____ 56—15

ANTONIO F. GUIDA, *Primary Examiner.*

ABRAHAM G. STONE, *Examiner.*